United States Patent [19]

Onmori et al.

[11] Patent Number: 4,728,056
[45] Date of Patent: Mar. 1, 1988

[54] MAGNETIC TAPE CASSETTE WITH IMPROVED HUB LOCKING MEANS

[75] Inventors: Shozo Onmori; Shingo Katagiri, both of Kanagawa, Japan

[73] Assignee: Fuji Photo Film Co., Ltd., Kanagawa, Japan

[21] Appl. No.: 911,597

[22] Filed: Sep. 25, 1986

[30] Foreign Application Priority Data

Oct. 18, 1985 [JP] Japan .................. 60-158681[U]

[51] Int. Cl.$^4$ ........................................ G03B 1/04
[52] U.S. Cl. .............................................. 242/198
[58] Field of Search ............... 242/197, 198; 360/132

[56] References Cited

U.S. PATENT DOCUMENTS

| | | | |
|---|---|---|---|
| 4,288,048 | 9/1981 | Sieben | 242/198 |
| 4,408,733 | 10/1983 | Ooishi et al. | 242/199 |
| 4,513,929 | 4/1985 | Oishi et al. | 242/198 |
| 4,572,461 | 2/1986 | Horikawa | 242/198 |
| 4,579,295 | 4/1986 | Harada | 242/198 |
| 4,629,144 | 12/1986 | Schoettle | 360/132 X |

*Primary Examiner*—Stuart S. Levy
*Assistant Examiner*—Katherine Matecki
*Attorney, Agent, or Firm*—Sughrue, Mion, Zinn, Macpeak, and Seas

[57] ABSTRACT

In a magnetic tape cassette which has a locking member (1), the locking member is provided with protrusions (6) for abutting and locking in place hubs 13 around which a magnetic tape (12) is wound. The hubs are supported in receiving parts (4) of a window member (3). The window member has protrusions (5) that fit in recesses (7) in a lower portion of the locking member, so that the locking member will be supported between the protrusions of the window member and the upper half (2) of the cassette case.

5 Claims, 3 Drawing Figures

MAGNETIC TAPE CASSETTE WITH IMPROVED HUB LOCKING MEANS

BACKGROUND

1. Field of Industrial Application

This invention relates to magnetic tape cassettes, and more specifically to a novel compact magnetic tape cassette or audio device or the like which is equal to or smaller than the "Phillips" type magnetic tape cassette in size.

2. Conventional Magnetic Tape Cassettes

Recently, cassette tape recorders have been remarkably decreased both in size and in weight, and magnetic tape cassettes therefore have also been miniaturized, In addition, in the field of audio technique, there has been a strong demand for the provision of magnetic tape cassettes which are suitable for high-quality, high-density recording and reproducing operations of long period. In order to satisfy this requirement, a magnetic tape cassette has been proposed in the art which is operated according to a digital system such as a pulse code modulation (PCM) system in which, unlike an analog system, input signals are converted into pulse signals to perform signal recording and reproducing operations. In the magnetic tape cassette, the recording frequency band of the magnetic tape therein must be about five times as wide as that of a conventional audio tape. For this reason, large video tape cassettes wider in recording frequency band than the audio compact cassettes have been extensively employed.

Video tape cassettes, except for special ones, are operated using the rotary head system, The video tape cassettes are provided with a guard panel which is adapted to close the opening formed in the front part of the cassette and is swingable towards the top of the cassette. That is, in the case of the magnetic tape cassette operated according to the digital system, high-density wide-frequency-band recording and reproducing operations, which are short in recording wavelength when compared with the conventional audio compact cassette, are carried out. Therefore, the cassette's structure should be such that the magnetic tape therein is sufficiently protected.

The magnetic tape cassette to which the technical concept of the invention is applied is one which, similar to the previously mentioned video tape cassette, is applicable to audio devices employing a relatively wide frequency band signal recording and reproducing system. In addition, the magnetic tape cassette is equal to or smaller than the conventional audio compact magnetic tape cassette in size; that is, the magnetic tape cassette is an extremely small one. Accordingly, it can be expected that similar to the conventional audio compact magnetic tape cassette, the extremely small magnetic tape cassette is frequently carried and used outdoors. Therefore, the cassette should have a structure which can positively prevent jamming of the magnetic tape which may be caused when the cassette is vibrated and slackened while being carried about.

One example of a magnetic tape cassette which has been proposed to meet the above-described requirement has a locking member. The locking member functions to lock the hubs, on which the magnetic tape has been wound, when the magnetic tape cassette is not being used, and to release the hubs when the casssette is used. The locking member is urged towards the hubs by a spring, so that, when the cassette is not being used, two protrusions of the locking member are abutted against the hubs, respectively, to stop the rotation of the hubs. When the cassette is used, the protrusions are moved away from the hubs. However, as the size of the cassette is decreased, its components are also miniaturized. Therefore, it is rather difficult to combine the locking member with the cassette body. Furthermore, as the locking member is combined with the cassette body while being urged by the spring. it is liable to come off during assembly, Thus, the locking member is one of the factors which make it difficult to assemble the magnetic tape cassette.

The conventional locking member has disadvantages during operation as well as during assembly of the cassette. During operation, the locking member is urged towards the hubs by a spring so that the locking member slides horizontally. However, the locking member is not supported in a vertical direction. Therefore, when the hubs are released, the locking member is bent causing the locking member's protrusion or flat part to contact the magnetic tape which is wound on the hubs. The contact can scratch tge magnetic tape. The contact can also apply an unwanted load to the magnetic tape. If the load is applied to the magnetic tape in this manner, then the magnetic tape cannot run at a constant speed, and it is impossible to perform signal recording and reproducing operations with high accuracy.

SUMMARY OF THE INVENTION

According to the invention, there is provided a magnetic tape cassette having a pair of hubs on which a magnetic tape is wound, a slidable locking member urged by a spring to lock and release the hubs, and a window member fitted in the upper half case thereof so that the inside of the cassette can be observed through it. The window member has at least one protrusion which is extended towards the front of the cassette, the locking member has a recess for receiving the protrusion of the window member, and the locking member is slid with the bottom thereof held between the upper half case and the protrusion of the window member.

As was described above, the bottom of the recess formed in the locking member is held between the protrusion of the window member and the upper half case, so that the vertical movement of the locking member is limited and the locking member is movable accurately towards the front or towards the rear of the cassette. Under the condition that the locking member is combined with the upper half case and limited in vertical movement, the spring is attached to the locking member to urge the latter. Therefore, the cassette can be readily assembled, and the elastic force of the spring accurately urges the locking member towards the rear of the cassette. Moreover, the hubs of the cassette case can be locked and released with high reliability and without damaging the tape or applying unwanted loads to the tape. Thus, the cassette according to the invention eliminates the above-described disadvantages.

DETAILED DESCRIPTION OF THE INVENTION

An embodiment of the invention will be described with reference to the accompanying drawings.

Figure 1:
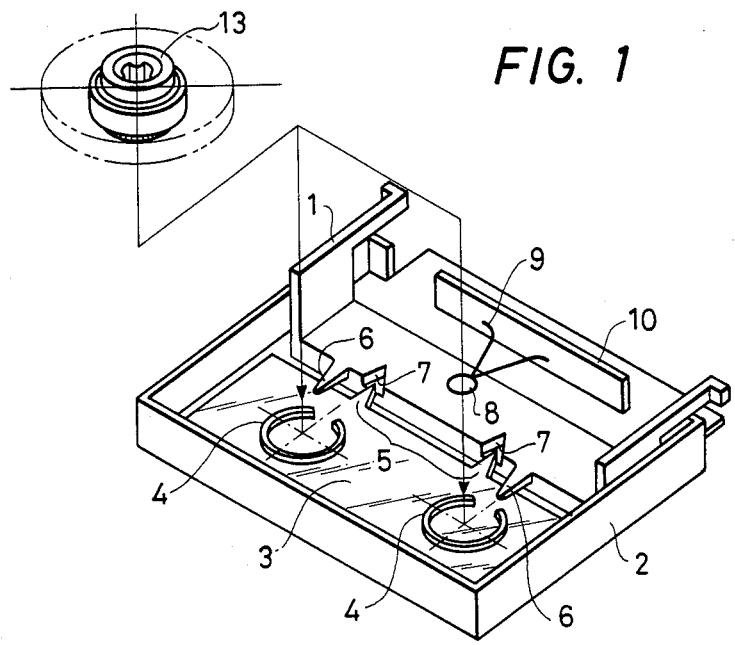
FIG. 1 is a perspective view showing a locking member combined with the upper half case in a magnetic tape cassette according to the invention.

FIG. 1 is a perspective view showing a locking member 1 which is combined with an upper half case 2 of a magnetic tape cassette according to the invention. A window member 3 is fixedly secured to the upper half case 2, for instance, by ultrasonic welding. The window member 3 has receiving parts 4 adapted to hold the upper edges of hubs 13, and has a pair of window member protrusions 5 extended from its front towards a front wall 10 of the cassette.

The locking member 1 has a pair of locking member protrusions 6 which are adapted to abut against the peripheries of the hubs to lock the hubs 13. The locking member 1 also has a pair of recesses 7, formed in an end portion facing towards the rear of the cassette, for receiving the protrusions 5 of the window member 3. The locking member 1 has a pin 8 formed at the center. A spring 9 is mounted on the pin 8 such that the spring 9 is abutted against the front wall 10 of the upper half case 2, thereby urging the locking member 1 towards the rear of the cassette.

Figure 2:
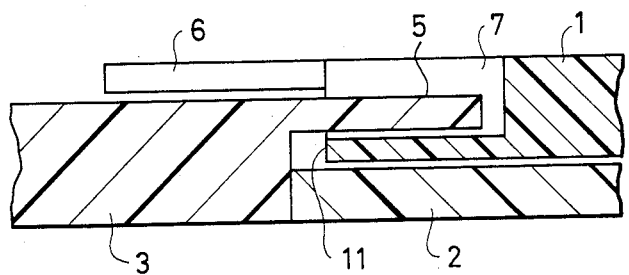
FIG. 2 is a sectional view showing parts of the locking member and the upper half case.
Figure 3:
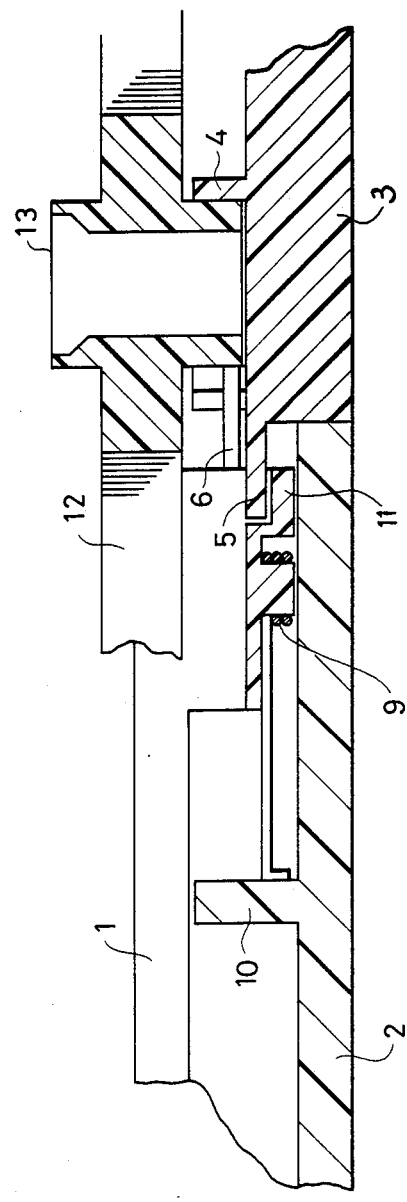
FIG. 3 is a sectional side view showing a part of the cassette according to the invention.

FIG. 2 is a sectional diagram showing the window member protrusions 5 and the recesses 7. The protrusions 5 are extended like collars from the inner surface of the window member 3. The bottom 11 of each of the recesses 7 is located between the upper half case 2 and a corresponding one of the protrusions 5. The protrusions 5 of the window member 3 are slidably engaged with the bottoms 11 of the recesses 7 of the locking member 1, respectively. The protrusions 5 limit the vertical movement of the locking member 1 so that the locking member 1 may accurately be slid towards the front and towards the rear of the cassette. When the protrusions 5 abut against the innermost parts of the recesses 7, the protrusions 6 of the locking member 1 which are extended over the window member 3 are able to enter the gaps in the split or open ring receiving parts 4. As a result, the protrusions 6 abut against the peripheries of the hubs to lock the latter. As was described above, the locking member 1 is maintained urged by the spring 9 towards the rear of the cassette. Therefore, when the cassette is not being used, the locking member 1 locks the hubs 13 at all times. However, when the cassette is used, the hubs 13 can be released by forcibly sliding the locking member 1 towards the front of the cassette against the elastic force of the spring 9. The length of the window member protrusions 5 should be longer than the slide stroke of the locking member so that, when the locking member 1 is slid towards the front of the cassette to reach the hub releasing position, the bottoms 11 of the recesses 7 are still held between the upper half case 2 and the protrusions 5. The window member protrusions 5 and the recesses 7 for receiving the protrusions 5 are substantially triangular in FIG. 1; however, the invention is not limited thereto or thereby.

The above-described magnetic tape cassette is assembled as follows: First, the window member 3 is fixedly secured to the upper half case 2, for instance, by ultrasonic welding. Then, the locking member 1 is combined with the upper half case 2 in such a manner that the protrusions 5 of the window member 3 are engaged with the recesses 7 of the locking member 1 while the bottoms 11 of the recesses 7 are held between the upper half case 2 and the protrusions 5. Thereafter, the spring 9 is attached to the pin 8 of the locking member 1 in such a manner that the spring 9 pushes against the front wall 10 of the upper half case 2 thereby to urge the locking member 1 towards the rear of the cassette. After the remaining components such as the hubs 13 on which the magnetic tape has been wound are combined with the upper half case, the upper and lower half cases are combined, Thus, the magnetic tape cassette according to the invention has been assembled.

As is apparent from the above description, the locking member is not urged by the spring when it is combined with the upper half case, and therefore the locking member can be readily placed at the predetermined position in the upper half case. Furthermore, the spring can be coupled to the upper half case with the locking member held by the protrusions of the window member; that is, the spring can be readily coupled to the pin of the locking member, and the locking member is urged toward the rear of the cassette immediately when the spring is installed as described above. Since the vertical movement of the locking member is limited by the protrusions of the window member, the locking member will never be bent, and the protrusions of the locking member can positively lock or release the hubs 13.

In the above-described embodiment, one pair of protrusions are extended from the window member so that the locking member is positively held; however, substantially the same effect can be obtained merely by forming one protrusion at the window member and one corresponding recess in the upper half case, or several protrusions at the window member and several corresponding recesses in the upper half case.

According to the invention, the locking member can be combined with the upper half case without being urged by the spring. Therefore, combining the locking member with the upper half case and installing the spring can be achieved with ease. Thus. the magnetic tape cassette according to the invention can be readily assembled. In the magnetic tape cassette thus assembled, the vertical movement of the locking member is limited, and the protrusions and the flat part of the locking member are allowed to move only in the horizontal direction. Therefore, the hubs are locked and released with high reliability, and the locking position of the hubs is accurate. Accordingly, the difficulty that the protrusions or flat part of the locking member may contact the magnetic tape wound on the hubs 13 due to deformation of the locking member during use of the cassette is eliminated in the magnetic tape cassette according to the invention. Therefore, the magnetic tape is never scratched by the protrusions or flat part of the locking member, and no unwanted load is applied to the magnetic tape. Accordingly, the tape running speed is maintained constant, which provides accurate recording and reproducing operations. Thus, the magnetic tape cassette according to the invention is high is assembling efficiency and excellent in quality.

What is claimed:

1. A magnetic tape cassette for housing a magnetic tape, having a upper half case (2), said magnetic tape cassette comprising:

(a) a window member (3) supported by said upper half case and disposed adjacent a back wall of said case, receiving portions (4) located on said window member for supporting rotatable hubs, and at least one protrusion (5) extending laterally from said window member towards a front wall of said case; and (b) a spring loaded locking member (1) movable in a horizontal direction and supported by said upper half case (2), said locking member being movable to a first position for preventing at least one hub (13) from rotating and movable to a second position for allowing rotation of said hub, said locking member having at least one recess (7) for receiving said protrusion (5), said locking member having a bottom surface (11) defining a portion of the recess furthest from the magnetic tape, wherein said locking member is prevented from moving in a vertical direction toward the magnetic tape by contact between said bottom surface and said protrusion of said window member.

2. The magnetic tape cassette of claim 1, wherein said recess is located at a portion of said locking member remote from the front wall of said case and facing said window member.

3. The magnetic tape cassette of claim 1, wherein a length of said protrusion of said window member received by said recess when said locking member is in said first position is greater than the distance from said first position to said second position, whereby at least a portion of said protrusion will be within said recess when said locking member is in said second position.

4. The magnetic tape cassette of claim 1, wherein said at least one recess comprises two recesses, and said at least one protrusion comprises two protrusions, said two recesses respectively receiving said two protrusions.

5. A magnetic tape cassette, comprising:
(a) a cassette case half (2);
(b) a generally planar window member (3) mounted to the case half;
(c) a tape storage hub (13) rotatably disposed on the window member;
(d) a generally planar locking member (1) disposed for sliding movement parallel to the case half and window member towards and away from the hub between a first position whereat a protrusion (6) extending outwardly from an upper edge of the locking member and overlying the window member engages the hub to prevent the rotation thereof and a second, withdrawn position whereat the protrusion is disengaged from the hub to enable the rotation thereof; and
(e) means for preventing the vertical movement of the locking member in a direction away from the case half and window member and perpendicular to the direction of said sliding movement to thereby prevent the protrusion from disruptively engaging a tape wound on the hub, said preventing means comprising;
  (1) a recess (7) defined in an upper edge of the locking member and having a bottom wall (11) parallel to the plane of the locking member; and
  (2) a projection (5) extending outwardly from an upper edge of the window member and coplanar therewith, and overlying at least a portion of the recess bottom wall in both the first and second positions of the locking member.

* * * * *